United States Patent
Nader et al.

(10) Patent No.: US 10,356,701 B2
(45) Date of Patent: Jul. 16, 2019

(54) ADAPTATION OF A MAXIMUM CELL DETECTION ATTEMPT COUNTER FOR NEIGHBOR CELL DETECTION

(71) Applicant: Telefonaktiebolaget LM Ericsson (publ), Stockholm (SE)

(72) Inventors: Ali Nader, Malmo (SE); Joakim Axmon, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 5 days.

(21) Appl. No.: 15/313,962

(22) PCT Filed: May 27, 2014

(86) PCT No.: PCT/EP2014/060982
§ 371 (c)(1),
(2) Date: Nov. 24, 2016

(87) PCT Pub. No.: WO2015/180760
PCT Pub. Date: Dec. 3, 2015

(65) Prior Publication Data
US 2017/0135027 A1 May 11, 2017

(51) Int. Cl.
*H04W 48/16* (2009.01)
*H04W 4/80* (2018.01)
(Continued)

(52) U.S. Cl.
CPC .......... *H04W 48/16* (2013.01); *H04B 17/318* (2015.01); *H04J 11/0086* (2013.01);
(Continued)

(58) Field of Classification Search
None
See application file for complete search history.

(56) References Cited

U.S. PATENT DOCUMENTS

| 2005/0032542 A1 | 2/2005 | Wilborn et al. |
| 2009/0209278 A1 | 8/2009 | Narang et al. |
| (Continued) | | |

FOREIGN PATENT DOCUMENTS

| EP | 2320702 A1 | 5/2011 |
| EP | 2557841 A1 | 2/2013 |

OTHER PUBLICATIONS

PCT International Search Report, dated Jul. 31, 2014, in connection with International Application No. PCT/EP2014/060982, all pages.
(Continued)

*Primary Examiner* — Lonnie V Sweet
(74) *Attorney, Agent, or Firm* — Leffler Intellectual Property Law, PLLC

(57) ABSTRACT

A user equipment comprising a radio frequency communication interface, a memory and a controller, said user equipment being serviced by a servicing cell and wherein said controller is configured for detecting a neighboring cell by attempt to detect a signal over a radio frequency, determine if a signal is received over said radio frequency, and, if so, determine a detected cell based on said signal being received over said radio frequency and identify said detected cell as a neighboring cell; and, if not, increase a attempt counter, said attempt counter indicating a number of attempts to detect a signal over said radio frequency. The UE is further configured to determine whether said attempt counter equals a maximum number of attempts and if so, determine that no cell is present on said radio frequency; and, if not attempt to detect a signal over a radio frequency again. The user equipment is characterized in that said maximum number of attempts is associated with a network environment parameter.

14 Claims, 3 Drawing Sheets

(51) Int. Cl.
*H04W 36/00* (2009.01)
*H04B 17/318* (2015.01)
*H04J 11/00* (2006.01)

(52) U.S. Cl.
CPC ........... *H04J 11/0093* (2013.01); *H04W 4/80* (2018.02); *H04W 36/0094* (2013.01)

(56) References Cited

U.S. PATENT DOCUMENTS

| | | | |
|---|---|---|---|
| 2009/0209827 A1 | 8/2009 | Narang et al. | |
| 2010/0272086 A1* | 10/2010 | Jung | H04W 48/02 370/338 |
| 2011/0045829 A1 | 2/2011 | Kubo | |
| 2012/0270537 A1 | 10/2012 | Weng et al. | |
| 2013/0017828 A1 | 1/2013 | Weng et al. | |
| 2013/0196659 A1* | 8/2013 | Damji | H04W 52/0225 455/434 |
| 2014/0242991 A1* | 8/2014 | Yanover | H04W 36/22 455/436 |
| 2015/0201419 A1* | 7/2015 | Zhou | H04W 72/02 370/329 |
| 2016/0088536 A1* | 3/2016 | Zingler | H04W 36/0088 455/437 |

OTHER PUBLICATIONS

PCT Written Opinion, dated Jul. 31, 2014, in connection with International Application No. PCT/EP2014/060982, all pages.

* cited by examiner

ADAPTATION OF A MAXIMUM CELL DETECTION ATTEMPT COUNTER FOR NEIGHBOR CELL DETECTION

TECHNICAL FIELD

This application relates to a method, a UE and a communication network system for improved determination of an appropriate coding scheme for radio frequency communication.

BACKGROUND

To enable a user equipment (UE) to be mobile, the UE has to be able to find new serving cells that it can move to. To find such serving cells the UE carries out measurements on carriers of various Radio Access Technologies (RATs) in idle and connected mode. The more RATs and bands a UE supports, the more carriers the UE needs to be measured. More measurements are needed in problematic areas or environments where a UE experiences poor coverage. As a result, strain is put on the limited radio resource needed for carrying out such measurements. The available radio time for measurements (apart from other activity for e.g. channel reception) has to be efficiently scheduled both for being able to find optimal coverage in a fast way and for being able to save radio time (less power consumption). In various parts of the 3GPP specifications (e.g. 45.008 for GSM, 25.123 and 25.133 for UMTS TDD and FDD respectively, and 36.133 for LTE), there are requirements on a UE to be able to detect and measure cells of various RATs and bands at band-specific minimum power levels and side conditions. In order to be able to find a cell at minimum power level, a UE needs to carry out a particular number of cell detection attempts and cell measurements on each targeted carrier. For example, a UE may need 7 measurement occasions on an LTE carrier before it can be concluded with sufficient confidence whether there is a cell on that carrier. The number of needed measurement occasions may differ between RATs. After the minimum number of measurements has been carried out without success in finding a cell, the UE can deduce that there is no cell being detectable according to the definition in the standard. The problem with the approach above is that the UE is required to spend a certain amount of measurement occasions (radio time) on measuring a carrier to be able to find a weak cell irrespective of what level of cell a UE is interested in.

SUMMARY

It is an object of the teachings of this application to overcome the problems listed above by providing a user equipment comprising a radio frequency communication interface, a memory and a controller, said user equipment being serviced by a servicing cell and wherein said controller is configured for detecting a neighbouring cell by attempt to detect a signal over a radio frequency, determine if a signal is received over said radio frequency, and, if so, determine a detected cell based on said signal being received over said radio frequency and identify said detected cell as a neighbouring cell; and, if not, increase a attempt counter, said attempt counter indicating a number of attempts to detect a signal over said radio frequency. The UE is further configured to determine whether said attempt counter equals a maximum number of attempts and if so, determine that no cell is present on said radio frequency; and, if not attempt to detect a signal over a radio frequency again. The user equipment is characterized in that said maximum number of attempts is associated with a network environment parameter.

This enables for faster cell detection as the UE does not spend time unnecessarily trying to detect cells that can not provide a sufficiently stable service.

It is a further object of the teachings of this application to overcome the problems listed above by providing a method for use in a user equipment comprising a radio frequency communication interface, said user equipment being serviced by a servicing cell, wherein said method comprises detecting a neighbouring cell by attempting to detect a signal on a radio frequency, determining if a signal is received on said radio frequency, and, if so, determining a detected cell based on said signal being received on said radio frequency and identifying said detected cell as a neighbouring cell. And, if not, increasing a attempt counter, said attempt counter indicating a number of attempts to detect a signal on said radio frequency and determining whether said attempt counter equals a maximum number of attempts, and if so, determining that no cell is present on said radio frequency, and, if not attempting to detect a signal on a radio frequency again. The method is characterized in that said maximum number of attempts is associated with a network environment parameter.

The inventors of the present application have realized, after inventive and insightful reasoning that by adapting the maximum number of attempts, several unnecessary cell detection attempts may be avoided thereby speeding up the cell detection of a UE.

The teachings herein allow for adapting the radio time needed for finding a cell to the situation the UE is in, i.e. adapt the radio time to the measurement level of a cell a UE is targeting for and spend time on carriers that historically shown good "track-record" in terms of coverage.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
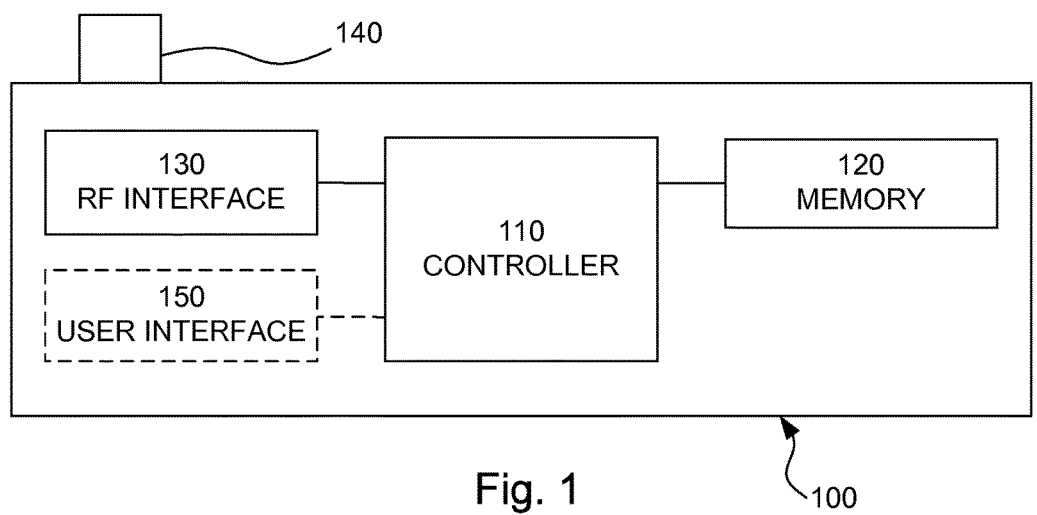
FIG. 1 shows a schematic view of the general structure of a UE according to one embodiment of the teachings of this application.

FIG. 1 shows a schematic overview of a User Equipment also referred to as UE (for example a mobile communications terminal such as a cellular telephone, a tablet computer or a computer having a radio frequency interface) adapted according to the teachings herein. In the embodiment shown the UE 100 is a device having at least one radio frequency communications interface, such as a cellular radio communications interface 130. The radio frequency (RF) communications interface 130 may be adapted to operate according to at least one of the radio frequency communications (such as cellular communication) standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. These communication standards govern the use of different Radio Access Technologies (RAT).

The radio frequency communications interface may also be adapted to operate according to a radio frequency standard such as Bluetooth™, IEEE standard 802.11, IEEEE standard IEEE 802.16, or ZigBee™.

The UE 100 also comprises at least one antenna 140 which may be external or internal.

The UE comprises a controller 110 which may be implemented as one or more processors. Such processors are commonly known and as a skilled person would realize there are many alternatives as how to implement a controller which alternatives include but are not limited to central processing units and programmable logic circuits. The UE further comprises a memory 120 which may be implemented using any commonly known technology for computer-readable memories such as ROM, RAM, SRAM, DRAM, FLASH, DDR, EEPROM memory, flash memory, hard drive, optical storage or any combination thereof. The memory 120 is used for various purposes by the controller 110, one of them being for storing operating instructions, other software and also data for use by the UE 100.

The UE 100 may optionally comprise a user interface 150 which may comprise any or a combination of a display (possibly a touch display), a number of light indicators, possibly implemented as LEDs (Light Emitting Diodes), and one or more keys.

Figure 2:
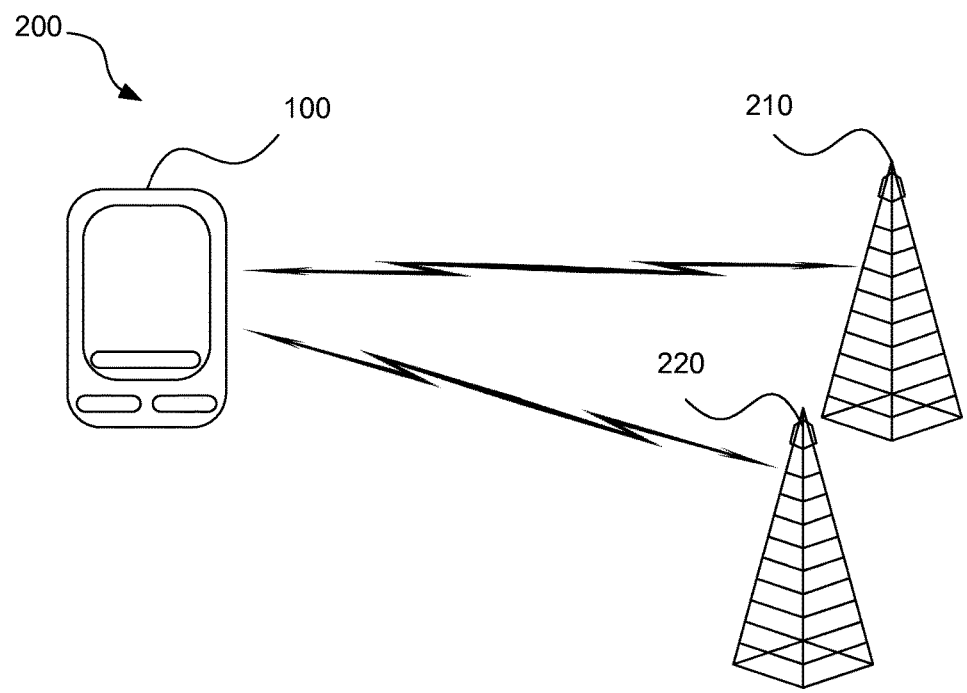
FIG. 2 shows a schematic view of a communication network system comprising a UE according to one embodiment of the teachings of this application.

FIG. 2 shows a schematic view of a network 200 in which the UE 100 is arranged to be used. The network 200 may be a network arranged to operate according to one (or a combination of) the radio frequency communication standards mentioned above in relation to the radio frequency communication interface 130. The network is shown to comprise one UE 100 and two base stations, a first base station 210 and second base station 220. In one embodiment the first base station 210 is associated with a first carrier and the second base station 210 is associated with a second carrier. In one embodiment (possibly being an embodiment as the previous) the first base station 210 is associated with a first RAT and the second base station 210 is associated with a second RAT.

It should be noted that although only one UE 100 and two base stations 210, 220 are shown in the figure, it should be clear that more UEs and base stations may be present in the network. It should also be noted that the two base stations 210, 220 may also represent and constitute different networks 200 that possibly overlap, but no such distinction will be made herein and as the distinction would be clear to a skilled person, especially as the two base stations 210, 220 may belong to two different telecommunications carriers, no further details will be given.

Figure 3:
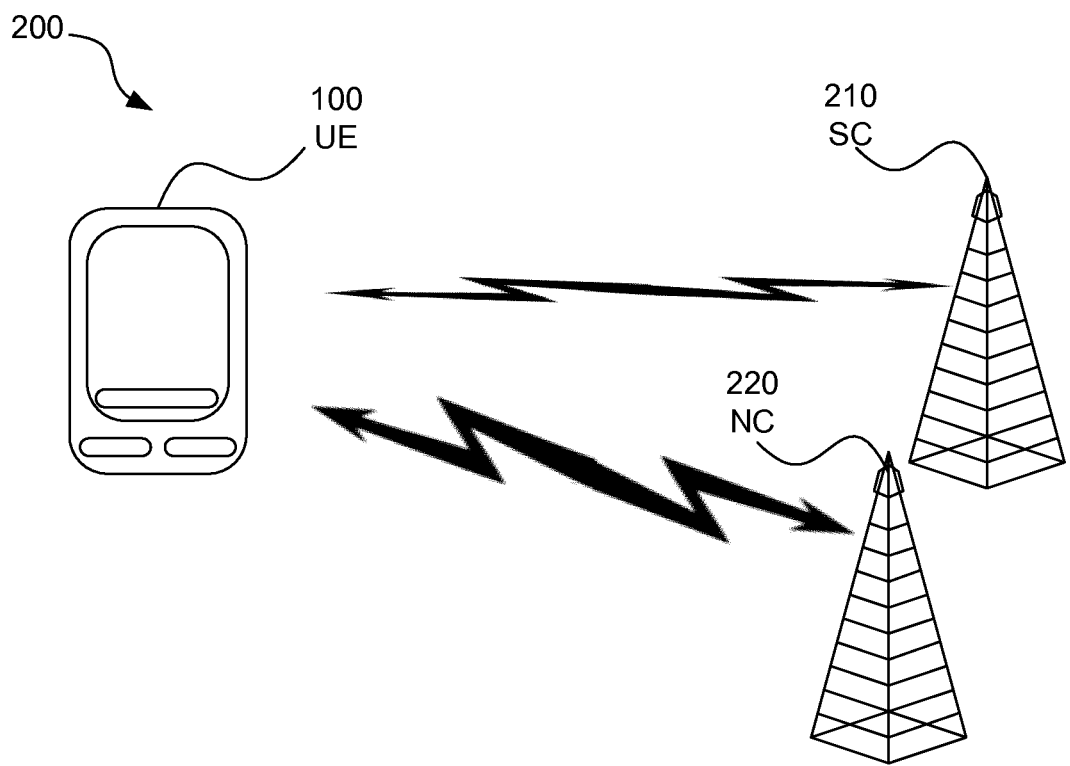
FIG. 3 shows a schematic view of an example communication network system comprising a UE according to one embodiment of the teachings of this application.
Figure 4:
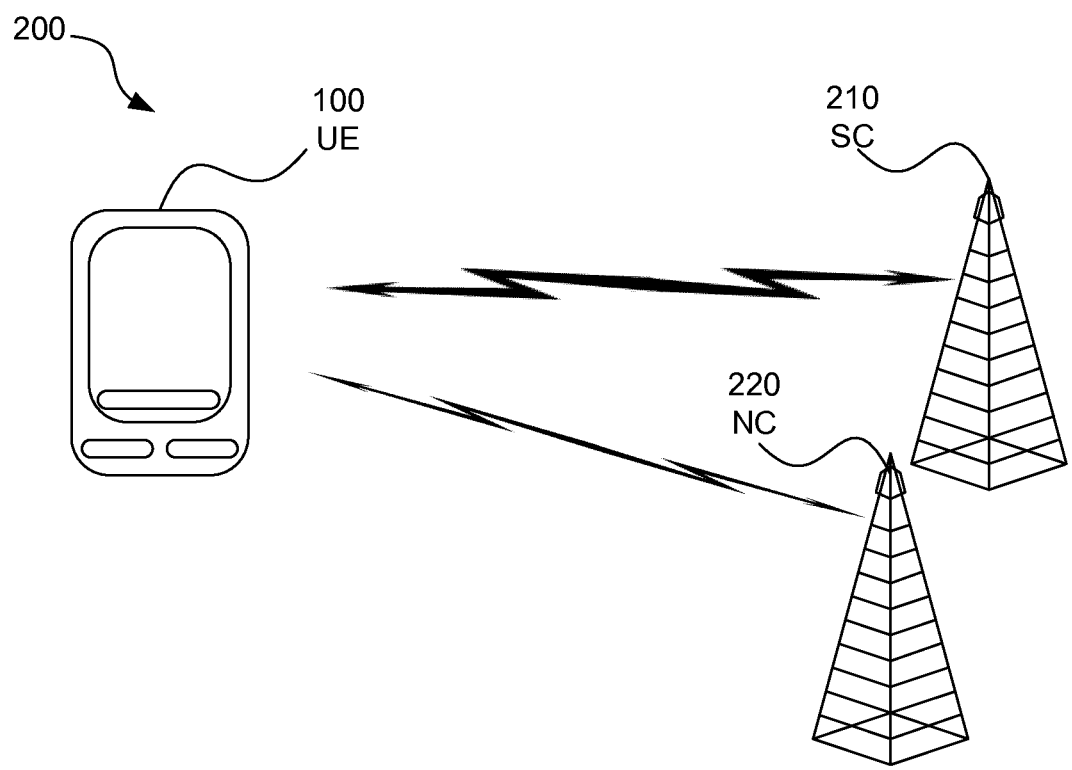
FIG. 4 shows a schematic view of a communication network system comprising a UE according to one embodiment of an example the teachings of this application.

In the network 200 of FIG. 2, each base station 210, 220 may serve a (network) cell. In the example of FIGS. 2, 3 and 4, the first base station will be referred to as a servicing cell, i.e. a base station that the UE 100 is currently being serviced by, and the second base station will be referred to as a neighbouring cell, i.e. a cell that the UE 100 is trying to detect for a possible handover.

As has been discussed in the background section the UE 100 is configured to perform cell detections and if a neighbouring cell is detected possibly establish a connection with that cell for executing a handover.

A cell detection attempt is performed by the UE monitoring a specific frequency band using a specific RAT, wherein the specific frequency band and specific RAT are associated with a carrier.

After a cell has been detected, a cell measurement is performed by the UE by measuring the signal strength of a signal received from the detected cell, i.e. transmitted by the base station serving the cell. The signal strength may be measured by for example measuring the Signal-To-Noise Ratio (SINR) or using other known signal quality measurements. The signal quality may also be determined by measuring the Block Error rate (BLER). During the cell measurements the UE determines if the signal quality is high enough for a connection to be successfully established with the corresponding base station.

FIG. 3 shows a schematic view of a UE 100 operating in an area where a network 200, such as the network of FIG. 2 is present. In this example, the UE 100 has established a connection with the first base station 210, being the servicing cell (SC) and is attempting to detect the second base station 220, i.e. the neighbouring cell (NC), for a possible handover.

The reasons for such a handover may depend on a number of factors. Some examples are quality of signal received (signal strength and/or noise level), pricing models or required service (voice or data traffic).

In the example of FIG. 3, the radio frequency signal transmitted by the first base station 210 is received at a first power level, for example −80 dB. The radio frequency signal transmitted by the second base station 220 is received at a second (higher) power level, for example −77 dB. In FIG. 3, the strengths of the signals being transmitted are indicated by the size of the zig-zag arrow representing the transmitted signal. The UE 100 will therefore be interested in making a handover to the neighbouring cell to ensure a higher signal quality.

Figure 5:
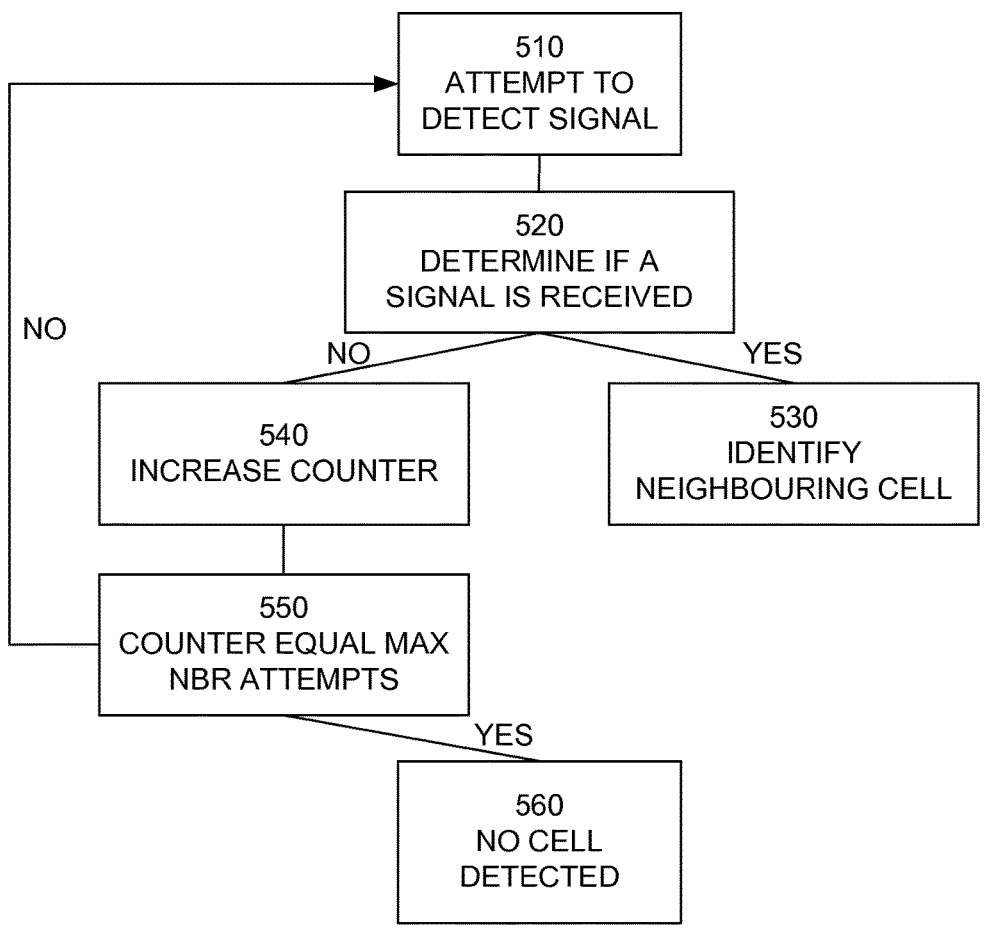
FIG. 5 shows a flowchart for a general method according to one embodiment of the teachings of this application.

The operation of the UE will now be described with simultaneous reference to FIG. 5, being a flowchart of a general method according to the teachings herein.

In one embodiment the UE 100 is configured to detect the neighbouring cell 220. The UE 100 detects the neighbouring cell 220 by attempting to detect a signal 510 by monitoring a radio frequency or frequency band using a RAT (possibly specific to a carrier) and receiving a signal on that frequency band that can be decoded using the RAT. If the controller determines that a signal is received 520, the controller decodes the signal received using the RAT and can thereby identify the detected cell 220 as being the detected cell 220 transmitting the received signal. As is known a coded signal will most often carry information regarding its transmitting base station. The transmitting cell is thus detected and identified 530 as a neighbouring cell 220.

If no signal is received, or a signal is received, but can not be decoded, possibly within a time period assigned to the cell detection attempt, the controller increases an attempt counter 540. The attempt counter indicates the number of attempts to detect a signal on the radio frequency.

To avoid wasting bandwidth the controller determines whether the attempt counter equals a maximum number of attempts 550 and if so, determines that no cell is present 560 on said radio frequency. If the number of attempts does not yet equal the maximum number of attempts, the controller proceeds with performing another attempt, i.e. returns to attempting to detect a signal 510.

The maximum number of attempts is chosen cleverly based on a network environment parameter. The network environment parameter indicates how easy or crucial it is to find a neighboring cell. The network environment parameter may be based on a signal strength of the serving cell 210. If the serving cell is received at a high signal strength, it may only be an advantage in finding a neighbouring cell 220 that is received at a higher signal strength (as in the example of FIG. 3) and as such a neighbouring cell 220 will be easy to detect the maximum number of attempts is adjusted by the controller 110 of the UE 100 to a lower number, than one possibly required by a standard. For example, the 3GPP standard indicates that a cell detection should be attempted up to 7 times, however, if a neighbouring cell 220 being received at a high signal strength is desired and such a neighbouring cell 220 would therefore be easy to detect, there is no need to repeat attempting to detect the neighbouring cell 220 if it is not detected early on. The maximum number of attempts may therefore be decreased or chosen to be low(er) to not waste time.

By reducing the number of times cell detection is attempted bandwidth is saved as unsuccessful cell detection attempts are identified quicker. This gives the UE 100 more time to attempt cell detections on more frequencies.

FIG. 4 shows another example of a UE 100 operating in an area where a network 200, such as the network of FIG. 2 is present. As in the example of FIG. 3, the UE 100 has established a connection with the first base station 210, being the servicing cell (SC) and is attempting to detect the second base station 220, i.e. the neighbouring cell (NC), for a possible handover.

In the example of FIG. 4, the radio frequency signal transmitted by the first base station 210 is received at a first power level, for example −80 dB. The radio frequency signal transmitted by the second base station 220 is received at a second (lower) power level, for example −83 dB. However, the signal received from the serving cell 210 is heavily distorted by interference (or possibly other noise) and the UE 100 will therefore be interested in making a handover to the neighbouring cell even if the signal from the neighbouring cell 220 is received at a lower signal strength, but possibly undistorted, to ensure a higher signal quality.

The examples of FIGS. 3 and 4 illustrate different criteria that are taken into consideration when determining a desired signal level when detecting a cell.

To detect a neighbouring cell without wasting bandwidth (or time), the maximum number of attempts is associated with the network environment parameter. The network environment parameter is defined to reflect the desired signal quality or expected desired signal quality of a neighbouring cell 220.

In one embodiment the network environment parameter is associated with a received signal strength of a signal received from said serving cell. This enables the UE to direct the cell detection according to the current signal level being received. T To illustrate reference will be given to the example of FIG. 3. As the UE is currently being serviced by the serving cell 210 providing signals having a good quality there is no advantage in trying to detect cells having a lower signal quality (or signal strength). The UE may thus adjust the maximum number of attempts to a lower number, say 1 or 2. A strong neighbouring cell 220 (i.e. a cell transmitting a signal being received with a high signal quality) will be detected easily and if a cell has not been detected quickly, there is no need for further attempts as such a neighbouring cell 220 will most likely not be a candidate for a handover in any case. The UE is then better served by proceeding with attempting to detect a cell on another frequency than keep trying to detect a weak cell.

In one such embodiment the network environment parameter is associated with an absolute signal strength of the serving cell 210. The UE simply determines the maximum number of attempts to be a lower number if the signal received from the serving cell is received at a high signal strength.

In another such embodiment the network environment parameter is associated with received signal strength of a signal received from said serving cell relative a desired signal strength of said neighbouring cell. The UE 100 may thus increase the maximum number of attempts or set it to a higher number if the desired signal strength is lower than the signal strength being received from the serving cell, and decrease the maximum number of attempts or set it to a lower number if the desired signal strength is higher than the signal strength being received from the serving cell.

In one embodiment the maximum number attempts is associated with said signal strength so that an increase in said signal strength corresponds to a decrease in said maximum number of attempts.

The 3GPP standard stipulates that cell detection should be attempted 7 times. A lower maximum number of attempts may be set to 1, 2 or 3 times. A higher maximum number of attempts may be set to 5, 6 or 7 times. The maximum number of attempts may also be set to 4 times for certain cases.

Naturally the number of attempts also depends on the RAT and the standard being utilized as would be apparent to a skilled person.

In one embodiment the network environment parameter is associated with a noise level for a signal received from said serving cell. If the noise level is high, the UE may have difficulties in decoding the received signal and further attempts may be necessary for correctly identifying and detecting a cell. Also the opposite is possible, in that if the noise level is low, the UE will likely not have difficulties in decoding the received signal and fewer attempts may be needed for correctly identifying and detecting a cell.

To enable for a faster adaptation, the UE is, in one embodiment, configured to store a signal level received from the neighbouring cell at a previous cell detection. The previous signal level may be stored in the memory of the UE and the network environment parameter is associated with said previously received signal level. This allows the UE to adapt the maximum number of attempts for a neighbouring cell based on a previous cell detection, i.e. without making any new determinations of for example received signal level at this cell detection or other noise or signal quality measurements. This enables the maximum number of attempts to be adapted more rapidly.

Also to enable a faster adaptation of the maximum number of attempts, the UE is, in one embodiment, configured to store a location and possibly data associated with that location. The location may correspond to one or more neighbouring cells. Such data may relate to signal levels received at this position previously, noise environments previously experienced etc. The network environment parameter is thus associated with the location. This enables the UE to determine or adapt the maximum number of attempts rapidly without having to make new measurements, simply by adapting the maximum number of attempts based on the present location.

The UE may also be configured to associate the network environment parameter with a time for a given location. It is possible that a location experiences different noise levels at different times of day, possibly resulting from other mobile communication traffic, but also weather conditions and other natural phenomena (such as radio storms) affecting the noise level in an area and which are dependent on time of day or perhaps time of year.

Stored and may be retrieved based on serving cell id, location, time, etc—does not need to be recalculated.

The UE 100 may store at least a determined maximum number of attempts, possibly associated with a neighbouring cell, a location and/or a time. This allows the UE to determine a maximum number of attempts without having to recalculate the maximum number of attempts, but simply retrieve it from a stored memory.

The UE 100 may further, in addition to or as a part of the cell detection, determine if the signal quality of the signal received from the neighbouring cell is good enough for establishing a connection over. To ensure that a weak signal is in fact strong enough to maintain a connection, multiple measurements may be carried out before a handover is executed.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 6:
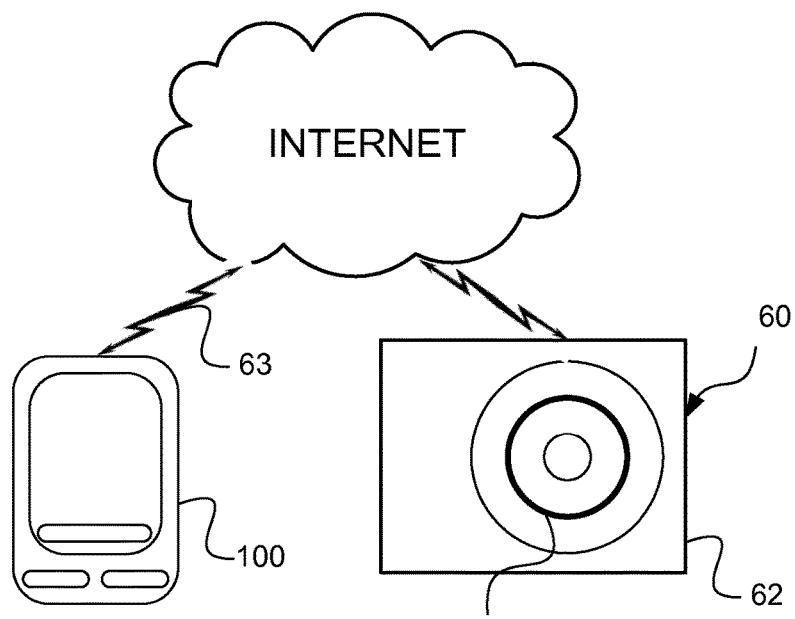
FIG. 6 is a schematic view of a computer-readable memory according to the teachings herein.

FIG. 6 shows a schematic view of a computer-readable medium as described in the above. The computer-readable medium 60 is in this embodiment a data disc 60. In one embodiment the data disc 60 is a magnetic data storage disc. The data disc 60 is configured to carry instructions 61 that when loaded into a controller, such as a processor, executes a method or procedure according to the embodiments disclosed above. The data disc 60 is arranged to be connected to or within and read by a reading device 62, for loading the instructions into the controller. One such example of a reading device 62 in combination with one (or several) data disc(s) 60 is a hard drive. It should be noted that the computer-readable medium can also be other mediums such as compact discs, digital video discs, flash memories or other memory technologies commonly used.

The instructions 61 may also be downloaded to a computer data reading device 100, such as a UE or other device capable of reading computer coded data on a computer-readable medium, by comprising the instructions 61 in a computer-readable signal 63 which is transmitted via a wireless (or wired) interface (for example via the Internet) to the computer data reading device 100 for loading the instructions 61 into a controller. In such an embodiment the computer-readable signal 63 is one type of a computer-readable medium 60.

The instructions may be stored in a memory (not shown explicitly in FIG. 6, but referenced 140 in FIG. 1) of the UE 100.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A user equipment comprising a radio frequency communication interface, a memory and a controller, said user equipment being serviced by a servicing cell and wherein said controller is configured for detecting a neighbouring cell by:
adapting a maximum number of attempts based on a network environment parameter that indicates how easy or crucial it is to find a neighbouring cell;
attempting to detect a signal on a radio frequency;
determining if a signal is received on said radio frequency, and, if so, concluding the neighbouring cell detecting by:
determining a detected cell based on said signal being received on said radio frequency and
identifying said detected cell as a neighbouring cell; and,
if not,
stepping an attempt counter, said attempt counter indicating a number of attempts to detect a signal on said radio frequency;
determining whether said attempt counter indicates that the maximum number of attempts have been made and if so,
concluding the neighbouring cell detecting by determining that no cell is present on said radio frequency; and,
if not
attempting to detect a signal on a radio frequency again.

2. The user equipment according to claim 1, wherein said network environment parameter is associated with a received signal strength of a signal received from said serving cell.

3. The user equipment according to claim 2, wherein said network environment parameter is associated with absolute signal strength.

4. The user equipment according to claim 2, wherein said network environment parameter is associated with received signal strength of a signal received from said serving cell relative a desired signal strength of said neighbouring cell.

5. The user equipment according to claim 2, wherein said maximum number attempts is associated with said signal strength so that an increase in said signal strength corresponds to a decrease in said maximum number of attempts.

6. The user equipment according to claim 1, wherein said network environment parameter is associated with a noise level for a signal received from said serving cell.

7. The user equipment according to claim 1, wherein said network environment parameter is associated with a previous signal level received from said neighbouring cell at a previous cell detection.

8. The user equipment according to claim 1, wherein said network environment parameter is associated with said neighbouring cell through a location, said location corresponding to said neighbouring cell.

9. The user equipment according to claim 8, wherein said network environment parameter is further associated with a time.

10. The user equipment according to claim 1, wherein said memory is configured to store at least one maximum number of attempts.

11. The user equipment according to claim 1, wherein said radio interference type is a standard taken from a group of standards comprising Universal Mobile Telecommunications System (UMTS), 3GPP Long Term Evolution (LTE), High Speed Packet Access, HSPA, or Global System for Mobile communication, GSM.

12. The user equipment according to claim 1, wherein said radio interference type is a standard taken from a group of standards comprising Bluetooth™IEEE standard 802.11, IEEEE standard IEEE 802.16, or ZigBee™.

13. A method for use in a user equipment comprising a radio frequency communication interface, said user equipment being serviced by a servicing cell and wherein said method comprises detecting a neighbouring cell by:
  adapting a maximum number of attempts based on a network environment parameter that indicates how easy or crucial it is to find a neighbouring cell;
  attempting to detect a signal on a radio frequency;
  determining if a signal is received on said radio frequency, and, if so, concluding the neighbouring cell detecting by:
    determining a detected cell based on said signal being received on said radio frequency and
    identifying said detected cell as a neighbouring cell; and,
  if not,
    stepping an attempt counter, said attempt counter indicating a number of attempts to detect a signal on said radio frequency; and
    determining whether said attempt counter indicates that the maximum number of attempts have been made, and if so,
      concluding the neighbouring cell detecting by determining that no cell is present on said radio frequency, and,
    if not
      attempting to detect a signal on a radio frequency again.

14. A nontransitory computer readable storage medium encoded with instructions that, when loaded and executed on a processor, causes the processor to perform a method for use in a user equipment comprising a radio frequency communication interface, said user equipment being serviced by a servicing cell and wherein said method comprises detecting a neighbouring cell by:
  adapting a maximum number of attempts based on a network environment parameter that indicates how easy or crucial it is to find a neighbouring cell;
  attempting to detect a signal on a radio frequency;
  determining if a signal is received on said radio frequency, and, if so, concluding the neighbouring cell detecting by:
    determining a detected cell based on said signal being received on said radio frequency and
    identifying said detected cell as a neighbouring cell; and,
  if not,
    stepping an attempt counter, said attempt counter indicating a number of attempts to detect a signal on said radio frequency and
    determining whether said attempt counter indicates that the maximum number of attempts have been made, and if so,
      concluding the neighbouring cell detecting by determining that no cell is present on said radio frequency, and,
    if not
      attempting to detect a signal on a radio frequency again.

* * * * *